May 23, 1972      H. M. VALENTINE      3,664,632

LOCKING MEANS FOR A VALVE OPERATING PLUNGER

Filed Dec. 10, 1970

INVENTOR

HARRY M. VALENTINE

BY Scrivener Parker Scrivener + Clarke

ATTORNEY

United States Patent Office 3,664,632
Patented May 23, 1972

3,664,632
LOCKING MEANS FOR A VALVE OPERATING PLUNGER

Harry M. Valentine, Elyria, Ohio, assignor to Bendix-Westinghouse Automotive Air Brake Company, Elyria, Ohio
Filed Dec. 10, 1970, Ser. No. 96,846
Int. Cl. F16k 35/00
U.S. Cl. 251—101  9 Claims

ABSTRACT OF THE DISCLOSURE

In a valve device of the type having a reciprocable manually operable plunger and a knob carried thereby, the knob and plunger being movable downwardly within a casing a predetermined distance for operating a valve member together with a locking device cooperating with the casing for normally preventing movement of said plunger to said predetermined distance, the locking device being movable to a released position by relative movement of the knob with respect to the plunger.

DESCRIPTION OF THE INVENTION

The present invention is generally particularly directed to a valve device of the general type shown in the patent to Harry M. Valentine et al., No. 3,087,760 dated Apr. 30, 1963 wherein a compressed air braking system includes a spring actuated fluid pressure released actuator for the purpose of providing emergency or parking braking. With the valve shown in the patent the valve operating plunger may be readily manually moved upwardly or downwardly and is therefore of the push pull type. In the upper position the valve device is such that the exhaust valve is open, thus exhausting the compressed air from the spring brake to allow the latter to move to a braking position. On the other hand, when the valve device is moved a predetermined distance to the lower position, the exhaust valve is closed and the spring brake will be recharged with compressed air to release the brake. Since the valve device is located in the vehicle cab and therefore readily accessible, it will be understood that a parking brake application may be readily released by any person not familiar with the function of the valve device by merely moving the valve knob to its lower position. This action would release the spring brake thus causing movement of the vehicle if the latter were parked on a hill, for example.

It is accordingly an object of the present invention to provide a locking arrangement for a valve device of the foregoing character which is so constructed and arranged that the valve plunger may not be moved to the lower operating position upon merely pushing the plunger.

A further object is to provide the valve operating plunger with a control knob which must be moved upwardly to release the locking arrangement before the knob and plunger may be moved downwardly a predetermined distance for valve operation.

Other objects and novel features of the invention will readily appear from the following detailed description when taken in connection with the accompanying drawing. It will be understood that the drawing is utilized for purposes of illustration only and is not to be taken as a definition of the limits of the invention, reference being had for this purpose to the appended claims.

In the drawing wherein similar reference characters denote similar parts throughout the several views.

Figure 1:
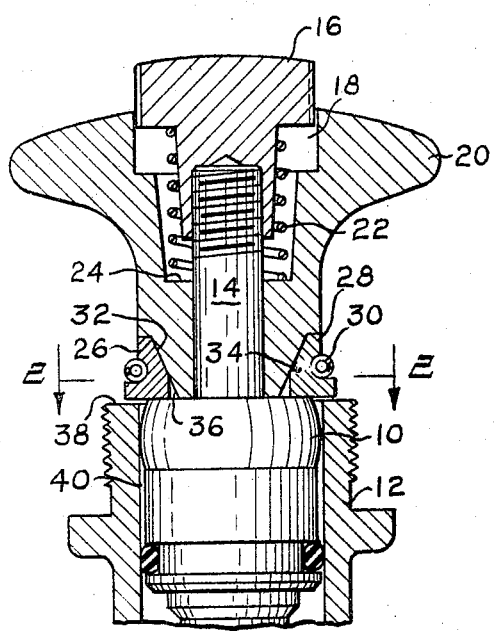
FIG. 1 is a partial view in section of a valve operating plunger including the novel locking means of the present invention and illustrating the position of the parts in the upper locked position.

Referring to FIG. 1, the novel locking means for a valve operating plunger is illustrated therein as including a plunger 10 mounted for reciprocating movement within a casing 12 for operation of valve members, not shown, carried by the plunger and cooperating with valve seats within the casing. Plunger 10 is provided with an upstanding stem 14 having a button 16 threaded on its upper end, and the button is positioned within a recess 18 formed in a control knob 20, the latter being slidably mounted on the stem 14. A spring 22 having its opposite ends respectively bearing against the button 16 and a lower wall 24 of the recess 18 normally serves to maintain the knob 20 in its lower position as shown. Due to this construction, it will be readily understood that the knob 20 may be moved upwardly against the action of the spring 22 to the position shown in FIG. 3 and this action is utilized for the control of the novel locking means of the invention in a manner which will appear more fully hereinafter.

Figure 2:
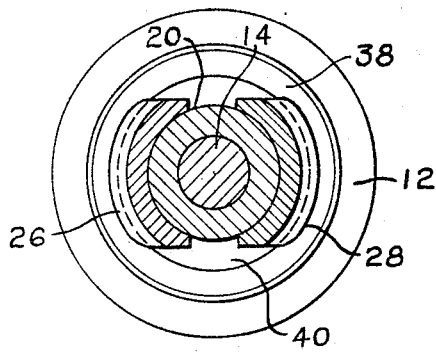
FIG. 2 is a transverse sectional view taken along line 2—2 of FIG. 1.

As shown, the novel locking means includes one or more segmental locking members 26, 28 which are associated with the lower end portion of knob 20 and are maintained in engagement therewith as by any suitable resilient means such as garter spring 30. The locking members 26, 28 are respectively provided with cam surfaces 32, 34 which cooperate with a conical cam surface 36 formed on the lower end of the knob 20, the arrangement being such that due to the action of the spring 22, the members 26, 28 will be cammed to the positions shown in FIGS. 1 and 2. Therefrom, it will be readily seen that the locking members 26, 28 overlie the upper end 38 of the casing 12 thus preventing movement of the knob 20 and plunger 10 downwardly to said predetermined position where the valve members controlled by the plunger are operated.

Figure 3:
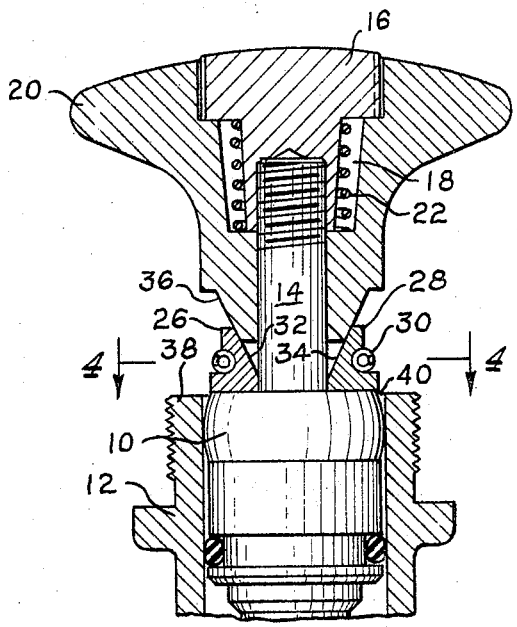
FIG. 3 is a sectional view similar to FIG. 1 but illustrating the position of the parts when the locking means is moved to the unlocked position.
Figure 4:
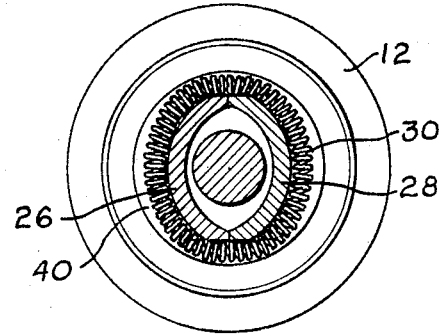
FIG. 4 is a transverse sectional view taken along line 4—4 of FIG. 3.

As shown in FIGS. 3 and 4, the knob 20 has been moved upwardly against the action of the spring 22 to enable the garter spring 30 to retract the locking members to a position where the diameter thereof is less than the bore 40 of the casing 12, see FIG. 4. Thereafter, it is only necessary to move the assembly comprising the button 16 and knob 20 downwardly with respect to the casing 12 in order that the plunger 10 and valve members may be moved the predetermined distance to operate the latter. In the case of the valve construction shown in the aforementioned patent, this movement would be sufficient to release the spring applied brakes. It will be readily understood that during return upward movement of the knob 20 and button 16, the locking members 26, 28 will again assume the locking position of FIG. 1 when the latter clear the upper end 38 of the casing, this being due to the action of the springs 30 and 22 and the camming action of the parts 32, 34 and 36.

From the foregoing it will be readily seen that the invention provides a relatively simple but effective locking construction for the operating plunger of a valve device of the push pull type, the arrangement being such that the plunger is normally locked in an upper position against downward movement a predetermined distance sufficient to operate valve members controlled thereby. While it is realized that downward movement of the button 16 in the FIG. 1 position will effect a slight downward movement of the plunger 10, such movement will be insufficient to close the exhaust valve in a valve construction of the type shown in the above mentioned patent.

While the invention has been described herein with considerable particularity, the scope thereof is defined in the appended claims.

What is claimed is:

1. In a valve device having a casing provided with an upper end and having a valve operating plunger slidably mounted therein, said plunger normally occupying an upper position and movable downwardly to a predetermined position for operating a valve member, the improvement which comprises means for locking said plunger against movement to said predetermined position including a member seccured to said plunger and positioned exteriorly of the casing, a manually operable knob movably mounted with respect to said member, movable locking means controlled by movement of said knob, resilient means interposed between said member and said knob and normally maintaining the latter in a locked position where the locking means is moved to overlie the upper end of the casing, said locking means and said knob being constructed and arranged that movement of the knob with respect to said member to compress the resilient means causes the locking means to move to an unlocked position to enable downward movement of said knob, member and plunger to said predetermined position.

2. The construction of claim 1 wherein said member includes a stem together with a button secured to the stem, said button being positioned within a recess formed in the knob.

3. The construction of claim 2 wherein the recess is provided with a bottom wall and the resilient means is positioned in the recess between said bottom wall and the button.

4. The construction of claim 3 wherein the locking means and the knob are respectively formed with cooperating camming surfaces and spring means for maintaining said camming surfaces in engagement at all times.

5. The construction of claim 3 wherein the locking means comprises at least one movable locking member of segmental shape.

6. The construction of claim 5 which includes a pair of locking members which are expanded to overlie the upper end of the casing when the knob is in said locked position and the locking members are retracted by said spring means when the knob is moved to compress the resilient means.

7. The construction of claim 1 wherein the locking means and the knob are respectively formed with cooperating camming surfaces and spring means for maintaining said camming surfaces in engagement at all times.

8. The construction of claim 7 wherein the locking means comprising at least one movable locking member of segmental shape.

9. The construction of claim 8 wherein the locking means is expanded to overlie the upper end of the casing when the knob is in said locked position and the locking means is retracted by said spring means when the knob is moved to compress the resilient means.

References Cited

UNITED STATES PATENTS 3,081,663   3/1963   Davis _____ 85—5 E

FOREIGN PATENTS 509,122   1/1955   Italy _____ 251—110

HENRY T. KLINKSIEK, Primary Examiner